United States Patent [19]
Born et al.

[11] Patent Number: 4,983,558
[45] Date of Patent: Jan. 8, 1991

[54] PROCESS FOR PRESULFURIZING A HYDROCARBON TREATMENT CATALYST

[75] Inventors: Maurice Born, Nanterre; Guy Parc, Rueil Malmaison; Hervé Toulhoat, Houilles, all of France

[73] Assignee: Institut Francais du Petrole, Rueil-Malmaison, France

[21] Appl. No.: 311,503

[22] Filed: Feb. 16, 1989

[30] Foreign Application Priority Data

Feb. 16, 1988 [FR] France ............... 88 01906

[51] Int. Cl.$^5$ .................. B01J 27/30; B01J 27/049; B01J 27/047; B01J 27/043
[52] U.S. Cl. .................. 502/31; 208/111; 208/120; 208/216 R; 502/29; 502/32; 502/33; 502/62; 502/85; 502/168; 502/202; 502/204; 502/219; 502/220; 502/221; 502/222; 502/223
[58] Field of Search .............. 502/31, 34, 168, 221, 502/220, 219, 222, 223, 62, 85, 202, 204, 30, 32, 33, 29

[56] References Cited

U.S. PATENT DOCUMENTS

| | | | |
|---|---|---|---|
| 3,697,499 | 10/1972 | Myers | 568/18 |
| 4,204,969 | 5/1980 | Papay | 252/45 |
| 4,530,917 | 7/1985 | Berrebi | 502/221 |
| 4,645,610 | 2/1987 | Born et al. | 568/18 |
| 4,719,195 | 1/1988 | Toulhoat et al. | 502/31 |
| 4,725,571 | 2/1988 | Tuszynski | 502/220 |
| 4,795,576 | 1/1989 | Born et al. | 568/18 |
| 4,839,069 | 6/1989 | Born et al. | 568/18 |

FOREIGN PATENT DOCUMENTS 0159936 10/1985 France .
2615861 12/1988 France .

*Primary Examiner*—Paul E. Konopka
*Attorney, Agent, or Firm*—Millen, White & Zelano

[57] ABSTRACT

The invention relates to a process for treating a new or regenerated catalyst containing a support having as a base at least one metal or metalloid oxide and at least one active metal, comprising treating the catalyst with at least one sulfuration agent dissolved in a solvent.

The invention is charcterized in that the sulfuration agent is a polysulfide with the following general formula

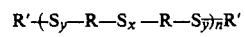

$$R'\text{-}(S_y\text{-}R\text{-}S_x\text{-}R\text{-}S_{\bar{y}})_n R'$$

where R is a linear or a branched organic radical comprising from 2 to 12 carbon atoms; R' is an alkyl, alkenyl, arylalkyl or arylalkenyl radical comprising from 1 to 12 carbon atoms, R' possibly comprising at least one heteroatom selected from the group consisting of oxygen, nitrogen, and sulfur; x has a value of from 1 to 4; y has a value of from 1 to 8 and n is such that the average molar mass of the polymer is about 5000.

17 Claims, No Drawings

PROCESS FOR PRESULFURIZING A HYDROCARBON TREATMENT CATALYST

BACKGROUND OF THE INVENTION

The present invention relates to a process for presulfurizing a hydrocarbon treatment catalyst and/or preconditioning a catalyst to be presulfurized.

It is often preferable to sulfurize metal components of some refining and/or hydrocarbon hydroconversion catalysts. Such "presulfuration" is carried out either when the catalysts are new or when they are regenerated prior to reuse.

Presulfuration is desirable when using refining reactions, for example, the desulfuration or hydrodesulfuration of such gasolines, as catalytic cracking or steam cracking gasolines, the sulfur content of which should be reduced before their use, with the octane number of these gasolines being unmodified, or modified as little as possible. Such desulfuration reactions are generally performed in the presence of hydrogen at between 200° and 400° C., under a pressure, for example, of from 5 to 60 bars, with a space velocity (expressed in $m^3$ of injected liquid feedstock per $m^3$ of catalyst per hour) of from 0.5 to 15, with a hydrogen partial pressure of from 4 to 60 bars. The feedstock is, for example, a gasoline generally distilling at between 30° and 220° C., with a bromine number of from 40 to 80 (g/100 g), comprising from about 15 to 45% by volume of olefins (essentially mono-olefins or minor amounts of diolefins) and from 15 to 25% of aromatic hydrocarbons.

The catalyst which is used for this type of desulfuration or hydrodesulfuration generally contains a non-acid support, for example, an alumina or alumina mixtures (U.S. Pat. No. 4,334,982), or any other appropriate support with at least one metal or metalloid oxide base such as magnesia (U.S. Pat. Nos. 4,132,632, and 4,140,626), silica, silica-aluminas, silica-magnesias, fluorinated silicas, boronic aluminas, clays, coals, fluorinated aluminas). These support mixtures appear at least partially in non-crystalline or crystallized form (zeolites). The catalyst also comprises from about 0.2 to 30% of at least one active metal selected from groups VI, VIII, or any other active metal, for example, from the group consisting of cobalt, molybdenum, nickel and tungsten (U.S. Pat. No. 3,732,155 and 3,804,748). A combination of two of these metals is generally used, for example cobalt-molybdenum, nickel-molybdenum, cobalt-tungsten, tungsten-molybdenum, cobalt-nickel, or nickel-tungsten couple. It is also possible to use, for example, a noble metal of group VIII from the platinum family such as platinum or palladium (U.S. Pat. No. 4,098,682).

Thus, in the prior art, the new or regenerated catalyst is generally subjected, before use, to presulfuration, which is achieved in the hydrodesulfuration reactor. By this process, the catalyst includes for example about 50 to 110% of the stoichiometric amount of sulfur calculated according to the metals present as follows:

$Co_9S_8$, $MoS_2$, $WS_2$ and $Ni_3S_2$.

In the prior art, presulfuration is achieved at a temperature greater than or equal to 180° C. and particularly 250° C.) the reaction temperature chosen for the hydrodesulfuration reaction, over several hours, by means of a hydrogen sulfide mixture which is generally diluted in hydrogen about 0.5 to 5% by volume), at an appropriate space velocity of from 1,000 to 3,000 liters of gas under normal temperature and pressure conditions per liter of catalyst per hour (U.S. Pat. No. 4,334,982). The presulfuration proper can be achieved stepwise with respect to temperature (French Patent No. 2,476,118). Various sulfurizing agents other than hydrogen sulfide $H_2S$), for example, a sulfur compound from the mercaptan series can be used, as well as carbon bisulfide ($CS_2$), other bisulfides, various disulfides, thiophenic compounds and preferably dimethylsulfide (DMS) and dimethyldisulfides (DMDS).

It is also better to sulfurize (presulfurize) a regenerated catalyst for hydrocarbon hydroreforming reactions (especially naphtha reforming) and aromatic hydrocarbon production reactions (aromizing), for example, for producing benzene, toluene and xylenes (ortho, meta or para), either from saturated or unsaturated (for example, pyrolysis, cracking, and particularly steam cracking or catalytic reforming gasolines) or from naphthenic hydrocarbons which can be converted into aromatic hydrocarbons through dehydrogenation.

These reactions are the generally performed at an average temperature of between 400° and 600° C., a pressure of from 1 to 60 bars, an hourly velocity of from 0.1 to 10 volumes of liquid naphtha per volume of catalyst, and at a recycle ratio of 0.5 to 20 moles of hydrogen per mole of feedstock.

The catalyst can, for example, contain at least one noble metal from the platinum series, (i.e., platinum, palladium, iridium, rhodium, ruthenium, or osmium), deposited on an appropriate support (i.e., alumina, silica, silica-alumina, fluorinated aluminas, fluorinated silicas, zeolites, or a combination thereof in an amount of between 0.1 and 5% by weight in relation to the catalyst. The catalyst can also contain at least one halogen (chlorine, fluorine, etc.) in a weight proportion of 0 to 15%.

Optionally, catalyst can also comprise at least one promoter metal in a weight promoter metals include those from groups VIII, VI A and VI B, I B and II B, III A, IV A, V A and V B, IV B, III B, I A and I B metals of the lanthanide series; and the noble and non-noble metals of group VII, particulating copper, silver, gold, germanium, tin, indium, thallium, manganese, rhenium, tungsten, molybdenum, niobium, and titanium.

In these catalytic reforming or aromatic hydrocarbon production reactions, sulfuration of the new or regenerated catalyst is accompanied by catalyst hydrogen reduction and is achieved in or near reactor head. The temperature in the sulfuration zone depends on the reduction temperature, which generally ranges from 480° to 600° C. However, although efficient, in situ sulfuration is a difficult and tedious process to implement (U.S. Pat. No. 4,172,027).

Prior art sulfurizing agents include hydrogen sulfide, either pure or diluted with diluted with hydrogen or gaseous hydrocarbons; dimethyldisulfides diluted with hydrogen; or other sulfur compounds such as alkylsulfides or alkylmercaptans diluted with hydrogen. The pressure is the same as that inside the reforming reactor or the aromatic hydrocarbon production reactor. The reaction duration ranges from minutes to days, depending on the operating conditions (see U.S. Pat. No. 4,172,027).

In some cases, presulfuration of a new or regenerated catalyst is desirable for the partial or total sulfuration of a catalyst having as a base one of the previously mentioned supports and at least one of the previously mentioned active metals, for use in such hydrocarbon conversion reactions such as reactions of hydrogenation, dehydrogenation, alkylation, hydroalkylation, dealkylation, hydrodealkylation, steam dealkylation, isomerization, and hydrodemetallization of heavy feedstocks.

When necessary, the sulfuration or presulfuration process can be advantageously carried out according to one of the above-described prior art techniques.

The catalyst metals employed in refining, hydrorefining or petrochemistry, whether new or regenerated, are most often used in oxidized for and sometimes in metallic form (especially in the case of certain reforming catalyst metals). Since the metals of these catalysts, are often active only in sulfide or partial sulfide form, they must be subjected to a catalyst sulfuration prior to use.

Because the catalyst regeneration process is increasingly being performed by specialists, sometimes far away from the industrial site, it is more productive to give the provide refineries with a ready-to-use product. This is now possible using the process of European Patent No. 84,400,234. In this process, a sulfur compound is incorporated into the catalytic mass, causing sulfuration or presulfuration of the catalyst when said catalyst is subsequently contacted with hydrogen in or near the reaction zone (feedstock treatment zone) of course, the sulfur compound can also be incorporated in the vicinity of the industrial unit at the catalyst treatment site, or off-site on a new or a regenerated catalyst before it is used in the industrial unit.

More precisely, in European Patent No. 84,400,234, the catalyst sulfuration process is characterized by a preliminary stage in which the sulfur compound is incorporated into the catalytic mass.

This preliminary incorporation stage (called pretreatment in situ or ex situ, depending on whether it is performed near or away from the industrial unit, e.g., at the catalyst regeneration or manufacturing site, need no longer be carried out next to the reactor i.e. at the reactor head or in zones in more or less direct communication with the reactors. As a result, the sulfur incorporation process need not depend on operating conditions (e.g., temperature, pressure, etc.) extant the reactors themselves or in annexes to these reactors (for example, the catalyst preliminary hydrogenation zone).

Subjecting the catalyst from the outset preferably to an activation reaction in the presence of hydrogen (generally over 100° C.), the process allows sulfurization of the active metal components of the catalyst due to the presence of hydrogen in situ, at the required stoichimetric or other.

In European Patent No. 84,400,234, at least one sulfurizing agent with the general formula $R_1-S_{(n')}-R_2$ i.e., an organic polysulfide, is used to incorporate sulfur in a pores of the new or regenerated catalyst.

In the polysulfide with the general formula: and $R_1-S_{(n')}-R_2$, $n'$ is an integral number ranging from 3 to 20, $R_1$ and $R_2$, which are identical or different from one another, represent organic radicals, each comprising 1 to 150 atoms of carbon per molecule, these radicals being selected from the group consisting of saturate, unsaturate, linear or branched, or naphthenic alkyl radicals aryl radicals, alkylaryl radicals and arylalkyl radicals, possibly containing at least one heteroatom. $R_2$ can also optionally be a hydrogen atom.

Preferred polysulfides include ditertiododecylpolysulfide ($n=5$), wherein $R_1$ and $R_2$ both are dodecyl radicals, and ditertiononylpolysulfide, ($n=5$), wherein $R_1$ and $R_2$ are nonyl radicals (TPS 37 is produced by ELF).

SUMMARY OF THE INVENTION

In the present invention, at least one sulfurizing agent, which is defined by its method of manufacture and the preferred formula given hereinafter, is incorporated into the pores of a new or regenerated catalyst in the absence of hydrogen.

Thus, the present invention relates to a process for treating a new or regenerated catalyst comprising a support having as a base at least one metal or metalloid oxide and at least one active metal, achieved in the absence of hydrogen, wherein the catalyst is treated with at least one special sulfurizing agent dissolved in a solvent.

DETAILED DESCRIPTION OF THE INVENTION

More specifically, invention relates to a process for treating a new or regenerated catalyst comprising a support having as a base at least one metal or metalloid oxide and at least one active metal, in order to subsequently achieve in the presence of hydrogen, total or partial sulfuration i.e. active metal or metals which are components of the catalysts in proportions which are or are not stoichiometric. The process is characterized in that the new or regenerated catalyst is treated by means of at least said sulfurizing agent, which is introduced into the catalyst pores a the required proportion at between 0° and 50° C.

According to the invention, the sulfurizing agent is an organic polysulfide which is essentially defined by its preparation method. These polysulfides are a result of the complex olefin polysulfide mixtures which are essentially defined by their manufacturing process (European Patent No. 159,936 and French Patent Application No. 27/07,560).

The main stages of the synthesis processes for these polysulfides are:
(1) the reaction of at least one compound selected from a sulfur chloride and/or dichloride with at least one olefin or a mixture of olefins comprising 2 to 12 carbon atoms in order to constitute an adduct;
(2) the addition of the adduct to at least one organic monohalogenide, functional or not, in order to constitute a halogenated mixture; and
(3) the reaction of said halogenated mixture with at least one alkaline polysulfide in an aqueous and/or an alcoholic medium in order to constitute an olefin polysulfide which can contain up to 65%, alternatively from about 20 to about 10% by weight of sulfur, said sulfurizing agent being dissolved in a solvent, for example, water or an alcohol.

According to a preferred method, the sulfurizing agent is obtained through a process wherein: (1) at least one sulfur monochloride and dichloride compound is reacted with at least one aliphatic monolefin with 2 to 12 carbon atoms in order to constitute an adduct; (2) hydrogen sulfide is reacted with dissolved sodium, potassium or ammonium hydroxide and sulfur in at least one substantially anhydrous aliphatic monoalcohol comprising 1 to 4 atoms of carbon per molecule; (3) said adduct obained in stage (1) and at least one monohalogenated saturate or unsaturated hydrocarbon compound are contacted with the alcoholic solution obtained in stage (2); (4) the mixture resulting from stage (3) is heated said monoalcohol is eliminated while water is added in such a proportion that the reagents and mineral products are maintained in solution form; and (5) after decantation and elimination of the aqueous phase, the organic phase, which is for the most part constituted of the desired olefin polysulfide composition, is collected.

In stage (1), 1.5 to 2.5 moles of aliphatic monolefin per mole of sulfur monochloride and/or dichloride are preferably used, at a temperature of 20° to 80° C.; in stage (2), 100 to 400 cm$^3$ of aliphatic monoalcohol and 0.1 to 1 mole of hydrogen sulfide per mole of hydroxide can be used. More particularly, 125 to 200 cm$^3$ of aliphatic monoalcohol per mole of hydroxide can be utilized.

The aliphatic monoalcohol is advantageously methanol and the hydroxide, soda; in stage (2), elemental sulfur can be added to the reaction mixture, the proportion of added elemental sulfur, constituting about 3.6 gram-atoms per mole of introduced hydroxide and preferably about 2.5 gram-atoms per mole of hydroxide.

The composition thus been obtained is such that the monohalogenated hydrocarbon compound represents 1 to 70% by gram-atom of halogen in relation to the adduct+monohalogenated hyrocarbon compound system, said adduct and said monohalogenated hydrocarbon compound representing a proportion of 1/1 to 0.5/1 by gram-atom of halogen per mole of hydroxide.

The following operating conditions are advantageous for obtaining the composition (sulfurizing agent): the reaction of stage (3) is achieved under a relative pressure of about 1 MPa; in stage (4), the temperature ranges from 50° C. to the mean reflux temperature.

A sixth stage can be carried out, in which the obtained olefin polysulfide composition is contacted with a basic compound and then washed with water; the process for preparing the composition can be achieved continuously, following a process with parallel flows and multiple contacts.

This composition, which exhibits a sulfur content of 40 to 65%, alternatively from about 20 to about 70% by weight, can have a chloride content less than about 0.1% by weight, preferably less than about 0.05% by weight.

According to another preferred method, the sulfurizing agent can be obtained in following stages:

(1) At least one sulfur monochloride and dichloride compound is reacted with at least one mono-olefin comprising 2 to 12 atoms of carbon, in a proportion of 1.5 to 2.5 moles of mono-olefin per mole of sulfur monochloride and/or dichloride, thus forming an adduct.

(2) Said adduct and at least one hydrocarbyl halide selected from among the alkyl chlorides, bromides, and iodides containing 1 to 12 atoms of carbon; the cycloalkyl or the substituted cycloalkyl chlorides, bromides, and iodides containing 5 to 12 atoms of carbon; and arylkyl or substituted arylkyl chlorides, bromides and iodides containing 6 to 12 atoms of carbon, the proportion of said alkyl halide corresponding to 1–70% by gram-atom of halogen in relation to the number of gram-atoms of halogen in the system constituted by said adduct and said hydrocarbyl halide, are contacted with at least one sulfur compound selected among the alkali metal, ammonium and alkaline earth metal sulfides, hydrogen sulfides and polysulfides, in a proportion of about 0.4 1.7 mole (possibly 0.4 to 0.8) per gram-atom of halogen contained within the system constituted by said adduct and said hydrocarbyl halogenide, and a proportion of elemental sulfur from 0 to 7 gram-atoms per mole of said sulfur compound, within a medium consisting of water or a mixture of water and aliphatic monoalcohol; (3) the obtained mixture is warmed up and, after separation into two phases, the olefin polysulfide is recovered in the organic phase.

In stage (1) isobutylene or an isobutylene mixture with a minor proportion of di-isobutylene can be used as an aliphatic mono-olefin.

Said hydrocarbonyl halogenide can be selected, among the methyl, ethyl, isopropyl, n-propyl, tert-butyl, isobutyl, n-butyl, tert-amyl, isoamyl, n-amyl, n-hexyl, ethyl-2-hexyl, n-octyl, cyclohexyl and benzyl chlorides, bromides and iodides.

It should be noticed that this hydrocarbyl halogenide can be composed, at least partially, of a monohalogenated hydrocarbon compound comprising at least one functional group selected among the alcohol, phenol, carboxyl acid, amine, amide and thiol groups.

Besides, said sulfur compound can be selected among sodium sulfide, sodium hydrogen sulfide and sodium polysulfides.

In the Last method mentioned above, the proportion of elemental sulfur can range from 0.4/1 to 7/1 gram-atom per mole of sulfur compound, while in stage (2), said adduct and said hydrocarbyl halogenide are added to the medium containing said sulfur compound and optionally elemental sulfur and then maintained at a temperature from 20° to 100° C., for 10 minutes to 3 hours. In stage (3), the temperature can range from 50° C. to the reflux temperature, for 3 to 10 hours.

A fourth stage (4) can be considered, wherein the product obtained in stage (3) is treated with a basic compound. As for the first preferred method described above, the operations can be achieved continuously from stage (2) onwards, the reagents which are used in stage (2) being contacted following parallel flows and according to a process using multiple contacts. All the other operating conditions and special compositions are given in European Patent No. 159,936.

According to a preferred embodiment of the invention, the catalyst sulfuration process can be performed in two stages, A and B.

(A) In a first stage achieved ex situ, in the absence of hydrogen, generally between 0° and 50° C., or even between 0° and 150° C., the catalyst is treated with at least said sulfurizing agent in order to partially or totally incorporate this agent into the catalyst pores.

(B) In a second stage which is preferably carried out in situ and at a temperature higher than 100° C., preferably above 140° C., the catalyst activation stage is generally performed in the presence of hydrogen (optionally also in the presence of 0.1 to 10% by volume of steam, for example for 0.1 to 1%) on the metal or metals which are components of said catalyst. This second stage is generally achieved by the refiner. Some details are given hereunder.

As an example, the sulfurizing agent can be a polysulfide with the following general formula:

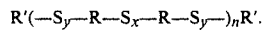

$$R'(-S_y-R-S_x-R-S_y-)_nR'.$$

In the general formula, R represents a hydrocarbon radical with 2 to 12 atoms of carbon, linear or branched, depending on the olefin or on the olefin mixture used in the synthesis.

R' is an alkyl, alkenyl, arylkyl or aryalkenyl radical comprising 1 to 12 atoms of carbon, able to contain at least one heteroatom (such as oxygen and/or nitrogen, and/or sulfur) and which depends on the monohalogenide that is used in the adduct preparation. x represents a number of sequential sulfur atoms depending on the halogenide or on the sulfur halogenide mixture that is used, x being a value from 1 to 4, preferably 1 or 2. y represents a number of sequential sulfur atoms depending on the amount of elemental sulfur utilized during the synthesis, y being a value from 1 to 8, preferably from 1 to 7.

According to the nature of R and R', and the values x and y, the degree of polymerization n can be such that the average molar mass of the polymer, measured by tonometry, reaches about 5,000.

The disadvantages of a conventional sulfuration method in situ can be summarized as follows:
  working temperature too high
  use of ill-smelling and toxic products ($H_2S$, $CS_2$, DMS or DMDS)
  risk of metal passivation through reduction of the oxides before their sulfuration
  impossibility of using feedstocks containing olefins, in order to avoid risks of polymerization
  difficulties about using heavy feedstocks of the vacuum distillate or of the residuum type because of their very low wetting power due to their high viscosity
  sulfuration duration (several hours to several days).

The advantages of the preliminary incorporation of a sulfur compound ex situ, according to the present invention, are the following:
  low working temperature
  either total and homogeneous catalyst sulfuration or sulfuration at the required sulfuration rate
  no risk of causing an oxidized metals reduction since, according to the invention, the treatment is achieved in the absence of hydrogen
  easy handling of the catalysts which are made non pyrophoric through the addition of water and/or light gasoline
  practically no bad smells and no toxicity
  possibility of using the catalyst for any dense charging method
  saving of time for the refiner and for the user of the catalysts
  maximum activity from the feeding of the reactor with the feedstock to be desulfurized.

The research studies that have been carried out within the scope of the invention have led to develop a sulfuration method of new or regenerated catalysts ex situ, a method which has the advantage of strongly limiting the industrial infrastructures that were required by the presulfuration techniques in prior art.

The object of this invention is thus to achieve the presulfuration of catalysts ex situ, while incorporating the required amount of sulfur and only the amount of sulfur needed by the user. The catalysts are thus delivered to the refinery or to any other unit, preconditioned to be presulfurized.

The refiner or any other user will just have to reactivate the catalyst in the presence of hydrogen, at a temperature ranging for example from 100° to 200° C. for a desulfuration catalyst and from 400° to 600° C. for a catalytic reforming or an aromatic hydrocarbon production catalyst, in order to react the sulfur on the contained metals and immediately start the hydrocarbon refining or conversion reaction by injecting the feedstock to be treated.

The catalyst sulfuration or presulfuration process according to the invention is thus characterized by a catalyst pretreatment with a sulfurizing agent as described above.

According to the invention, the process for incorporating sulfur into the catalyst is achieved in the absence of hydrogen and it allows to obtain the very precise degree of total or partial sulfuration required by the user. This sulfur incorporation is carried out between 0° and 50° C., preferably between 10° and 35° C., still more preferably at the room temperature.

Sulfuration according to the invention thus allows to add to the catalyst, in a highly precise way, through dilution with a selected solvent, the appropriate amount of sulfur, for example a stoichiometric amount in the case of hydrodesulfuration catalysts and critical but non stoichiometric amounts in the case of aromatic hydrocarbon reforming or production catalysts, these critical amounts depending on the nature of the metal or of each metal composing the catalyst (it is well-known that sulfur is a poison for reforming catalysts, it is therefore necessary to perfectly control the precise sulfur incorporation that is required, which is possible with the process of the present invention). This process thus allows to reach the sulfuration rate which is required by the user of the catalyst. The sulfurizing agent is used dissolved in an appropriate solvent which essentially depends on the nature of the sulfurizing agent, that is to say on the radicals it contains and which determine the amount of sulfur to be incorporated into the catalyst, generally by capillarity or porosity. In fact, the sulfuration processes vary according to the cuts to be treated following the invention. The selected solvent can be one of the following solvents, used alone or mixed together:
  a light gasoline, boiling for example between about 60° and 95° C.
  a gasoline of the hexane type, boiling between about 63° and 68° C.
  a gasoline of the F type, boiling between about 100° and 160° C., generally containing 10 to 20% of aromatic hydrocarbons, for example 15% (by volume)
  a gasoline of the white spirit type, boiling between about 150° and 250° C., generally containing 14 to 22% of aromatic hydrocarbons, for example 17% (by volume)
  or any other hydrocarbon or non-hydrocarbon cut equivalent to the previous gasolines.

Thus, according to the invention, a special sulfur compound is used as a sulfurizing agent, which is going to remain in the catalytic mass as soon as it is introduced. Afterwards, in situ, that is on the site or nearby (where the catalyst will be used for treating various feedstocks), during the conventional activation reaction which is performed in the presence of hydrogen, the sulfurizing agent which has been fed into the catalyst following a predetermined amount will be able to give rise to hydrogen sulfide which, in the presence of hydrogen, will lead to the required sulfide or sulfides of the metal or metals present in the catalyst, following for example exothermic reactions (1), (2) and (3) concerning, by way of example, the sulfuration of molybdenum, cobalt and nickel:

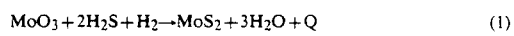

$$MoO_3 + 2H_2S + H_2 \rightarrow MoS_2 + 3H_2O + Q \qquad (1)$$

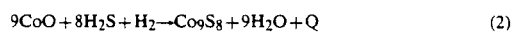

$$9CoO + 8H_2S + H_2 \rightarrow Co_9S_8 + 9H_2O + Q \qquad (2)$$

$$3NiO + 2H_2S + H_2 \rightarrow Ni_3S_2 + 3H_2O + Q \qquad (3)$$

The use of an appropriate solvent, in which the sulfurizing agent has been dissolved, allows to make use of the latent heat of vaporization of the selected solvent, and thus to absorb at least part of the exothermicity of the sulfuration reaction.

Another advantage of the ex situ process according to the invention is that there is no immediate need for hydrogen, which makes the handling of this gas useless at that point. Hydrogen is of course necessary further on, in order to activate the catalyst, but this stage is performed in situ since the use of hydrogen is necessary in any way for treating the cuts to be treated in the presence of the catalyst which has been sulfurized according to the invention.

The following tests, which are non limiting examples, should help understand more precisely the relevance of the invention.

It should also be added that, generally, the presulfuration of catalysts can be achieved with a new or regenerated product, that this presulfuration is carried out by adsorption of a stoichiometric amount, in relation to the metals, of highly sulfurized polysulfides and that adsorption of the polysulfide will be easier if it is dissolved in a solvent, particularly white spirit. The volume of polysulfide and of the selected solvent should preferably represent a value equal to the pore volume of the catalyst bed to be treated; as an example, for 100 g of new or regenerated catalyst (oxidized form), about 9 g of sulfur in the form of polysulfide are added to about 45 cm$^3$ of the polysulfide + solvent (white spirit for example) mixture. The adsorption of this polysulfide is generally achieved at ambiant air.

The solvent is then removed, preferably under an inert or non-oxidizing atmosphere, for example through steaming. The drying process is advantageously carried out at a temperature ranging from 50° to 200° C.

The activation process is then performed by the refiner, in the reactor where the presulfurized catalytic feedstock has been placed.

The bed can be cleaned with warm nitrogen in order to eliminate the presence of gaseous oxygen during the catalyst storing or transportation. Just before feeding the feedstock to be treated in order to start the activation in the refinery reactor, a hydrogen flow can be fed at 150° C. for example, with an hourly flow for instance at least forty times higher than the volume of the catalytic bed.

The temperature is going to slightly rise because of the exothermy; the gaseous mixture which appears (the produced $H_2 + H_2S$ mixture) can be optionally recycled and maybe used for limiting the temperature rise. The temperature should preferably be higher than 100° C. in order to avoid any liquid condensation and lower than 200° C. in order to avoid any risk of overheating.

The control of the sulfuration process is achieved by checking the temperatures, the evolution of the $H_2S$ content and the amount of water in the purge gas after the condensation (separation drum).

The main advantage of the process are summarized hereafter:
sulfuration achieved at a lower temperature easy handling of the catalysts since the sulfides are not ill-smelling; the olefin polysulfides have a light smell and are not toxic
more homogeneous sulfuration of the catalytic bed
possibility of using the ex situ infrastructures of the regeneration plants for the catalysts
reduced industrial infrastructure
no more storing of sulfur products that are hard to use, such as DMDS
reduced immobilization of the reactors
no risk of reduction of the metals that might cause hydrocracking reactions instead of the required hydrodesulfuration reactions which are generally researched in a selective way
in the case of hydrorefining of heavy cuts in order to hydrocrack or demetallize them, the refiner often has to presulfurize the catalyst by using a light feedstock which must be stored afterwards. According to this invention, it will be no longer necessary to proceed in such a complicated way, since the catalyst will be already sulfurized when the feedstock to be treated is fed.

It has also been possible to discover, within the scope of this invention, a way to accelerate the conversion of active metal oxides into metal sulfide afterwards, during the reactivation of the catalyst with hydrogen.

This means consists in incorporating the polysulfide into the catalyst pores ex situ, in the presence of at least one additive showing reducing properties and which is selected among the group constituted by the aldehydes comprising 4 to 14 atoms of carbon per molecule (preferably 5 to 12 atoms of carbon), the ketones or polyketones comprising 3 to 18 atoms of carbon per molecule (preferably 5 to 12), the ethers comprising 5 to 14 atoms of carbon per molecule (preferably 6 to 12), the alcohols or polyalcohols comprising 5 to 14 atoms of carbon per molecule (preferably 6 to 12) and the organic acids or polyacids comprising 3 to 14 atoms of carbon per molecule (preferably 6 to 12).

0.4 to 8% by weight, preferably 0.8 to 4% by weight and more especially 0.9 to 3% by weight of additive or additives will be advantageously used, in relation to the weight of the polysulfide or polysulfides that are used.

The additive or additives can for example be added to the polysulfide or polysulfides solution either pure or dissolved in an appropriate solvent. This solvent can be of the same type as the solvents used for dissolving the polysulfides, that is to say:
a light gasoline, boiling between about 60° to 95° C.
a gasoline of the hexane type, boiling between about 63° and 68° C.
a gasoline of the F type, boiling between about 100° and 160° C. and generally containing 10 to 20% of aromatic hydrocarbons, for example 15% (by volume)
a gasoline of the white spirit type, boiling between about 150° and 250° C. and generally containing 14 to 22% of aromatic hydrocarbons, for example 17% (by volume)
any hydrocarbon or non-hydrocarbon cut, equivalent to the previous gasolines.

The additive or additives used in the invention can be utilized in another solvent such as, for example, alcohols (methanol, ethanol, propanol, etc.) or other mineral or organic liquids known for dissolving the aldehydes, ketones, ethers, alcohols, polyalcohols, acids and polyacids that can be used according to the present invention.

Examples concerning these additives are to be found in European Patent No. 84,400,234.

In Examples 1 to 4 hereunder, the impact of the catalyst sulfuration method on the hydrorefining or the hydrotreatment of a hydrocarbon cut will be examined.

The cut to be hydrorefined is a model feedstock containing:

| 20% by weight of toluene |
| 2% by weight of thiophene |
| 78% by weight of cyclohexane |

The operating conditions are the following:

| Temperature | 360° C. |
| Total pressure | 60 bars |
| VVH | 2 |
| H2/HC | 350 l/h |
| Treatment duration | 48 hours |
| Catalyst volume used | 40 cm³ in the 4 examples, in order to determine the way to reach the best results. |

The analysis of the effluents is achieved by chromatography in the gaseous phase. In each test, the toluene hydrogenation activity (A) and the cyclohexane isomerization activity (I) into methylcyclopentane will be measured:

$$A = \text{Log} \frac{1}{1-x}$$

(Napierian logarithm) where x is the toluene conversion rate, that is to say:

$$x = \frac{\Sigma P}{\Sigma T}$$

Σ P representing the sum of the molar contents in the toluene conversion products (methylcyclohexane, ethylcyclopentane and the dimethylcyclopentanes) and Σ T represents the sum Σ P+ residual toluene content.

x is a value between 0 and 1 and is equal to 1 in the case of a 100% toluene conversion.

$$I = 100x \frac{\text{methylcyclopentane molar content}}{\text{methylcyclopentane molar content} + \text{residual cyclohexane molar content}}$$

(the isomerization activity I allows to measure the catalyst acidity).

The catalyst that is used is a usual commercial catalyst produced by Procatalyse HR 348; it contains 4% by weight of nickel oxide (NiO) and 16% by weight of molybdenum oxide (MoO₃), these active metals compounds being deposited on a gamma alumina.

EXAMPLES

Example 1 (comparative)

Before starting the hydrorefining process, the catalyst is presulfurized following a conventional method, as described hereunder:

The catalyst, the active metals of which are present in the form of their oxides, NiO and MoO₃, is charged into the reactor.

The unit is purged under hydrogen when cold and under a pressure of 1 bar (it has been checked whether the results are the same with a high pressure, 60 bars for example).

The catalyst is heated up to 150° C. under hydrogen and under a pressure of 1 bar (or 60 bars).

At the inlet of the reactor, the temperature of which is 150° C. (under a pressure of 60 bars), a sulfuration feedstock containing the following amounts is injected:

20% by weight of toluene
2% by weight of dimethyldisulfide
78% by weight of cyclohexane Dimethylsulfide causes the sulfuration of nickel and molybdenum oxides. The sulfuration operation conditions are the following:

VVH: 2
H2/HC: 350 l/h

The temperature is brought up to 280° C. and the sulfuration process is continued for 2 hours, then the temperature is brought to 320° C. for two or more hours and it is finally brought up to 350° C. for two hours. When the sulfuration of the catalyst is achieved, the sulfuration feedstock is replaced by the feedstock to be hydrorefined and the hydrorefining process is carried out in the same operating conditions as those mentioned above.

| Results: | A = 1.2 |
| | I = 0.6 |

Example 2 (comparative) carried out following the technique described in European Patent No. 84,400,234

In this example, the catalyst is sulfurized according to the method of European Patent No. 84,400,234, in two stages:

First stage

TPS 37, which is produced by ELF Aquitaine and contains about 37% by weight of sulfur (the formula has been given in the general part of this patent application), is used for presulfurizing the catalyst; a reagent volume (polysulfide+polysulfide solvent) equal to the impregnation volume of the catalyst feedstock to be treated must be utilized so that the total polysulfide is absorbed. The value corresponding to the total pore volume, or impregnation volume, determines the amount of solvent that is to be used. In the scope of the present test, this volume is 45 ml on average for 100 g of catalyst (60% of solvent and 40% of polysulfide). The solvent that is used is a white spirit (boiling point temperature between 150° and 250° C.). The working temperature is 24° C.

The stoichiometric proportion of sulfur necessary for sulfurizing the total oxides (NiO, MoO₃) afterwards is used, that is 8.5%. The catalyst is then dry-impregnated; this process is followed by an evaporation under 10 mm of mercury or under an inert gas current.

Second stage

The catalyst, the metals of which are present in the form of oxides and which contains sulfur in its pores, is fed into the reactor. The air in the reactor is purged and the reactor is placed under hydrogen when cold, under a pressure of 1 bar (the previous results are identical with a higher pressure, for example 60 bars). The catalyst impregnated with polysulfide is heated under hydrogen at a temperature of 150° C., in the presence of overheated steam (1% by volume), and the temperature is maintained at 150° C. for 2 hours. The catalyst becomes black because of the forming of metallic sulfides. The analysis of the catalyst sulfurized with TPS 37 shows the following values:

sulfur: 8.0% by weight carbon: 3% by weight.

Hydrorefining test

The pressure in the reactor is brought to 60 bars and the temperature is directly brought up to 350° C.

Results:  A = 1.35
          I = 0.8.

Example 3 (according to the invention)

There are 2 stages as in Example 2, but here, the catalyst presulfuration is achieved with an agent which is obtained as follows:

270 g of sulfur monochloride $S_2Cl_2$ (2 moles) are introduced into a 1 liter reactor provided with an agitator; then, 253 g of isobutylene (4.87 moles) in which 2.5 g of methanol have been previously dissolved are introduced by means of a plunging tube, under the surface of the $S_2Cl_2$ which is constantly stirred. The temperature of the reaction medium is maintained between 45° and 50° C. during whole isobutylene introduction stage (1 hour). 500 g of adduct are thus obtained. 98 g of soda in pellet form (2.45 moles) and 400 cm$^3$ of anhydrous methanol are fed into another 1 liter reactor provided with an agitator and topped by a system allowing distillation, and the mixture is stirred until it has totally dissolved.

By means of a plunging tube in the alcoholic phase, 41.65 of hydrogen sulfide (1.225 mole) are introduced for 1 hour, the reaction mixture being maintained at about 50° C. through external cooling.

152 g of sublimed sulfur (4.75 gram-atoms) are fed into the medium and the mixture, while it is stirred, is heated up to the methanol reflux temperature for 1 hour, in order to favor the forming of soda polysulfide.

By means of a dropping funnel, a mixture of 110 g of adduct and 105 g (i.e. about $113.4 \times 10^{-2}$ moles) of n-butyl chloride is introduced into the sodium polysulfide alcoholic solution (introduction during: 4 hours), the reaction temperature being regulated by the boiling methanol reflux.

The reflux is left reacting for 7 hours, then the methanol is progressively eliminated through distillation, while 350 cm$^3$ of water are progressively introduced into the boiling mixture.

After complete distillation of the methanol, the hot organic phase and the aqueous phase containing the formed NaCl and the sodium polysulfide excess are separated.

After the decantation, the collected organic phase is washed twice with water, dried on anhydrous $Na_2SO_4$ and filtered; 218.7 g of an orange yellow liquid are collected, which has the following characteristics:

sulfur contained in the additive: 63.8% by weight
residual chlorine in the additive: 0.0125% by weight
(125 ppm) (determination of X fluorescence)
kinematic viscosity at 100° C.: 12.3 mm$^2$/s After the first stage according to the process of the invention, which was achieved in the same operating conditions as in Example 2, the catalyst impregnated with the sulfur compound is subjected to the second stage, following the second stage in Example 2. At the end of the 2-hour treatment at 150° C., the catalyst is cooled down under nitrogen until it reaches the room temperature. The catalyst analysis shows about 8.5% by weight of sulfur and about 2% by weight of carbon.

The hydrorefining test is achieved as in Examples 1 and 2 and the following results are obtained:
A = 1.45
I = 1.0

Example 4

A catalyst is presulfurized as in Example 3. The catalyst is the same as that which is used in the previous examples. It is placed into a CATATEST reactor and the HDS and hydrodenitrogenation tests of a coking gas oil are carried out; once the catalyst is charged, subjected to an $H_2O$ scavenging when cold; the pressure is brought up to 100 bars and heat is applied. The gas oil feedstock is injected when the catalyst has reached 150° C. The temperature rises up to 300° C. and remains at this point for 15 mn, then the reaction temperature is maintained (300° C.) and this tester, which is representative of the industrial operating conditions concerning the catalyst, is carried out.

The test conditions are given in Table 2. Table 1 shows the characteristics concerning the coking gas oil feedstock.

The HDS and the HDN results, which have stabilized after 60 hours and 120 hours of continuous running, are compared to the results obtained in the same conditions, on the same catalyst, but sulfurized in situ as described in Examples 1 and 2.

|  | 100 b VVH = 4 after 60 hours | | 60 b VVH = 2 after 120 hours | |
|---|---|---|---|---|
|  | HDS | HDN | HDS | HDN |
| Example 1 | 96.8 | 84.9 | 97.2 | 81.2 |
| Example 2 | 95.8 | 85.9 | 97.5 | 82.9 |
| Catalyst presulfurized according to the invention | 96.6 | 86.6 | 97.5 | 85.0 |

The ex situ presulfuration technique according to the invention shows substantially better results than the other techniques.

TABLE 1

Characteristics of the tested feedstock

| FEEDSTOCK | COKING GAS OIL |
|---|---|
| Density at 20° C. (g/cm$^3$) | 0.857 |
| Sulfur (% by weight) | 0.45 |
| Nitrogen (ppm weight) | 420 |
| Average molecular weight (g) | 205 |
| Bromine number (g % g) | 17 |
| Cloud point (°C.) | −9 |
| Cetane index | 40 |
| Distillation | NF |
|  | M07-002 |
| IP (°C.) | 161 |
| 5% (°C.) | 194 |
| 10% (°C.) | 203 |
| 50% (°C.) | 256 |
| 90% (°C.) | 328 |
| 95% (°C.) | 338 |
| EP (°C.) | 350 |

TABLE 2

Characteristics of the catalytic test

|  | COKING GAS OIL TEST |
|---|---|
| Stage 1 | |
| Total pressure (bars) | 100 |
| Temperature (°C.) | 360 |
| VVH | 4 |
| H2/HC ratio (Nl/l) | 250 |

TABLE 2-continued

| Characteristics of the catalytic test | |
|---|---|
| | COKING GAS OIL TEST |
| Duration (hours) | 60 |
| Stage 2 | |
| Total pressure (bars) | 60 |
| Temperature (°C.) | 360 |
| VVH | 2 |
| H2/HC ratio | 250 |
| Duration (hours) | 60 |
| Catalyst volume (cm$^3$) | 50 |

Presulfuration with toluene + CC$_6$ + DMDS feedstock (CC$_6$ = cyclohexane)

Examples 3 and 4 show that the process of the invention has the advantages that have been described above, which represents a significant gain concerning the catalytic performances in relation to the activation techniques of refining catalysts in prior art.

We claim:

1. A process for sulfurizing a new or regenerated hydrocarbon refining or hydroconversion catalyst containing a support which is at least one metal or metalloid oxide and at least one active metal, said process being conducted in the absence of hydrogen, wherein said catalyst is treated with at least one sulfurizing agent dissolved in a solvent, said agent being obtained by a process comprising: (a) reacting at least one compound selected from the group consisting of sulfur chloride and sulfur dichloride with at least one olefin or olefin mixture containing 2 to 12 atoms of carbon per molecule, to form an adduct; (b) mixing said adduct with at least one monohalogenated hydrocarbon compound; (c) reacting the product of step (b) with at least one alkali metal, ammonium or alkaline earth metal sulfide, hydrogensulfides, or polysulfide in an aqueous and/or alcoholic medium to form an olefin polysulfide containing from about 20 to about 70% by weight of sulfur.

2. A process according to claim 1, wherein prior to sulfurization, said catalyst is deactivated in a hydrocarbon reaction, said sulfurizing comprising a first step achieved ex situ from said hydrocarbon processing reaction and in the absence of hydrogen, in which the catalyst is treated with at least said olefin polysulfide sulfurizing agent whereby said agent is totally or partially incorporated into the catalyst pores, said agent being dissolved in a solvent, and during a second stage in situ, activating the catalyst, wherein the obtained catalyst is treated with hydrogen whereby sulfur is added to the metal components of said catalyst.

3. A process according to claim 1, wherein the sulfurizing agent is dissolved in at least one solvent selected from the group consisting of a light gasoline boiling between about 60° to 95° C., a hexane gasoline boiling between about 63° and 68° C., an F-gasoline boiling between about 100° and 160° C. (containing 10 to 20% by volume of aromatic hydrocarbon) and a white spirit gasoline boiling between about 150° and 250° C.

4. A process according to claim 1, wherein the process is conducted in the presence of 0.4 to 8% by weight, in relation to the product polysulfide weight, of at least one additive selected from the group consisting of aldehydes of 4 to 14 atoms of carbon per molecule, ketones or polyketones of 3 to 18 atoms of carbon per molecule, ethers of 5 to 14 atoms of carbon per molecule, alcohols or polyalcohols of 5 to 14 atoms of carbon per molecule and organic acids or polyacids of 3 to 14 atoms of carbon per molecule.

5. A process according to claim 1, wherein the sulfurizing agent contains an olefin polysulfide with a sulfur content of up to 65% by weight and a chlorine content of less than 0.1% by weight of the olefin polysulfide obtained by a process comprising: (1) reacting at least one compound selected from the group consisting of sulfur monochloride and dichloride with at least one aliphatic mono-olefin with 2 to 12 atoms of carbon to form an adduct; (2) reacting hydrogen sulfide with dissolved sodium, potassium or ammonium hydroxide and sulfur in at least one substantially anhydrous aliphatic monoalcohol of 1 to 4 atoms of carbon per molecule; (3) contacting said adduct obtained in stage (1) and at least one monohalogenated hydrocarbon compound with the alcoholic solution obtained at the end of stage (2); (4) heating the mixture resulting from stage (3), eliminating said monoalcohol while adding water sufficient to maintain the reagents and the mineral products dissolved; (5) collecting after decantation and elimination of the aqueous phase the organic phase containing the olefin polysulfide composition.

6. A process according to claim 1, wherein the sulfurizing agent contains an olefin polysulfide prepared by a process comprising the following steps: (1) reacting at least one compound selected from the group consisting of sulfur monochloride and dichloride with at least one mono-olefin of 2 to 12 atoms of carbon, in a proportion of 1.5 to 2.5 moles of mono-olefin per mole of sulfur monochloride and/or dichloride, thus forming an adduct; (2) contacting said adduct and at least one hydrocarbyl halide selected from the C$_1$ and C$_{12}$ alkyl, the C$_5$ to C$_{12}$ cycloalkyl or substituted cycloalkyl, the C$_6$ to C$_{12}$ arylalkyl or substituted arylalkyl chlorides, bromides and iodides, the proportion of said alkyl halide corresponding to 1–70% grams-atoms of halogen in relation to the number of grams-atoms of halogen in the mixture of said adduct and said hydrocarbyl halide, with at least one sulfur compound selected from the group consisting of alkali metals, ammonium, and alkaline-earth metal sulfides, hydrogensulfides and polysulfides, in a proportion of about 0.4 to 1.7 mole, per gram-atom of halogen contained in the mixture of said adduct and said hydrocarbyl halide, and a proportion of elemental sulfur from 0 to 7 grams-atoms per mole of said sulfur compound, within a medium consisting of water or a mixture of water and aliphatic monoalcohol; (3) heating the resulting mixture and recovering the olefin polysulfide in the organic phase after separation into two phases.

7. A process according to claim 1 wherein the olefin polysulfide has the following general formula:

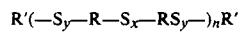

$$R'(-S_y-R-S_x-RS_y-)_nR'$$

where R is an organic radical, linear or branched, of 2 to 12 atoms of carbon, R' is an alkyl, alkenyl, arylalkyl or arylalkenyl radical of 1 to 12 atoms of carbon, R' optionally containing at least one heteroatom selected from the group consisting of oxygen nitrogen and sulfur, x being a value from 1 to 4 and y a value from 1 to 8.

8. A process according to claim 1, wherein the support is alumna, magnesia, silica, silica-alumina, a silica-magnesia, a fluorinated silica, a boronic alumina, clay, coal, a fluorinated alumina, a zeolite, or a mixture thereof.

9. A process according to claim 1, wherein the active metal is a Group VII or VIII metal.

10. A process according to claim 1, wherein the active metal is cobalt, molybdenum, nickel, tungsten, a mixture thereof, platinum palladium, iridium, rhodium, ruthenium, or osmium.

11. A process according to claim 1, wherein the catalyst is a hydrocarbon desulfuration or hydrodesulfuration catalyst.

12. A process according to claim 1, wherein the catalyst is a hydrocarbon cracking catalyst.

13. A process according to claim 9, wherein the catalyst contains a promoter metal selected from the group consisting of metals of Groups VIII, VIA, VIB, IB, IIB, IIIA, IVA, VA, VB, IVB, IIIB, IA, and the lanthanide series.

14. A process according to claim 13, wherein the promoter metal is copper, silver, gold, germanium, tin, indium, thallium, manganese, rhenium, tungsten, molybdenum, niobium, or titanium.

15. A process according to claim 1, wherein the monohalogenated hydrocarbon compound is a methyl, ethyl, isopropyl, n-propyl, tert-butyl, isobutyl, n-butyl, tert-amyl, isoamyl, n-amyl, n-hexyl, ethyl-2-hexyl, n-octyl, cyclohexyl or benzyl chloride, bromide or iodide, optionally containing an alcohol, phenol, carboxyl, amino, amido, or thiol group.

16. A process according to claim 1, wherein subsequent to treatment of the catalyst with the sulfurizing agent, the active metal is substantially totally sulfurized in the presence of a stoichiometric amount of hydrogen by feeding an effective amount of said agent into the catalyst pores at a temperature of 0°–50° C.

17. A process according to claim 16, wherein the catalyst is deactivated following use in a hydrocarbon processing reaction and is sulfurized ex situ from said processing reaction.

* * * * *